US005758862A

United States Patent [19]

Sturman

[11] Patent Number: 5,758,862

[45] Date of Patent: Jun. 2, 1998

[54] SOLENOID PUMP OPERATED VALVE

[75] Inventor: Oded E. Sturman, Woodland Park, Colo.

[73] Assignee: Sturman Industries, Woodland Park, Colo.

[21] Appl. No.: 703,523

[22] Filed: Aug. 27, 1996

[51] Int. Cl.[6] .......................... F16K 31/04; F16K 31/126

[52] U.S. Cl. ................................ 251/25; 60/432; 60/477; 251/57

[58] Field of Search ........................ 60/432, 477; 251/25, 251/57

[56] References Cited

U.S. PATENT DOCUMENTS

| | | | |
|---|---|---|---|
| 3,120,103 | 2/1964 | Beard et al. | 60/432 |
| 3,175,500 | 3/1965 | Zeigler | 60/469 |
| 3,200,591 | 8/1965 | Ray | 60/432 |
| 4,054,155 | 10/1977 | Hill | 251/25 |
| 4,247,077 | 1/1981 | Banick et al. | 251/57 |
| 4,463,773 | 8/1984 | Kojima et al. | 251/57 |

*Primary Examiner*—George L. Walton
*Attorney, Agent, or Firm*—Blakely Sokoloff Taylor & Zafman

[57] ABSTRACT

A flow control valve that has a solenoid operated pump that moves a poppet between an open and a closed position. The valve has a housing with an inlet, an outlet and a housing chamber that can allow fluid to flow from the inlet to the outlet. The poppet is located within the housing chamber and is adapted to move from an open position to a closed position, to control the flow of fluid through the valve. Attached to the poppet is a pump that has a first pump chamber separated from a second pump chamber by a wall. The wall has a first one way valve that allows fluid to flow from the second chamber to the first chamber. The second chamber has a diaphragm attached to a solenoid. The solenoid is provided with a series of energizing pulses that move the diaphragm and cause the second chamber to expand and contract. The pumping action of the second chamber causes fluid to flow into the first chamber. The first chamber thereby expands and moves the poppet into the open position. When the pump is turned off, a return spring moves the poppet back into the closed position.

6 Claims, 2 Drawing Sheets

SOLENOID PUMP OPERATED VALVE

BACKGROUND OF THE INVENTION

1. Field of the Invention

The present invention relates to fluid control valves.

2. Description of Related Art

Valves are typically used to control fluid flow within a pneumatic or hydraulic system. Most valves have a housing with an inlet connected to a source of fluid and an outlet connected to an output line. In a typical valve, the housing contains a poppet that normally closes the path between the inlet and outlet ports, to prevent fluid from flowing through the valve. The poppet is typically connected to a solenoid. When the solenoid is energized, the poppet moves into an open position, so that fluid can flow through the valve. The valve may also have a return spring that moves the poppet back into the original closed position, when the solenoid is deenergized.

The movement of the poppet within most commercially available solenoid control valves is typically short, such that the orifice within the valve is relatively small. The small orifice restricts fluid flow and creates a large pressure drop across the valve. It would therefore be desirable to have a solenoid control valve that creates a minimal pressure drop through the valve.

SUMMARY OF THE INVENTION

The present invention is a flow control valve that has a solenoid operated pump that moves a poppet between an open and a closed position. The valve has a housing with an inlet, an outlet and a housing chamber that can allow fluid to flow from the inlet to the outlet. The poppet is located within the housing chamber and is adapted to move form an open position to a closed position, to control the flow of fluid through the valve.

Coupled to the poppet is a pump that has a first pump chamber separated from a second pump chamber by a wall. The wall has a first one way valve that allows fluid to flow from the second chamber to the first chamber. The second chamber has a diaphragm attached to a solenoid. The solenoid is provided with a series of energizing pulses that move the diaphragm and cause the second chamber to expand and contract. The pumping action of the second chamber causes fluid to flow into the first chamber through the one way valve. The first chamber thereby expands and moves the poppet into the open position, wherein the inlet is in fluid communication with the outlet. The pump chambers are connected to a reservoir which allows fluid to flow from the first chamber back to the second chamber. The expansion of the first chamber and the movement of the poppet is such that a large orifice is created between the inlet and outlet. The large orifice reduces the pressure drop across the valve. When the pump is turned off, a return spring moves the poppet back into the closed position.

The pump is a closed hydraulic system that uses a working fluid separate from the fluid controlled by the valve. The pump fluid is therefore less susceptible to contamination, increasing the overall life of the valve.

Therefore it is an object of this invention to provide a solenoid control valve that has a large poppet displacement.

It is also an object of this invention to provide a flow control valve that does not have a large pressure drop through the valve.

BRIEF DESCRIPTION OF THE DRAWINGS

The objects and advantages of the present invention will become more readily apparent to those skilled in the art after reviewing the following detailed description and accompanying drawings, wherein.

DETAILED DESCRIPTION OF THE INVENTION

Figure 1:
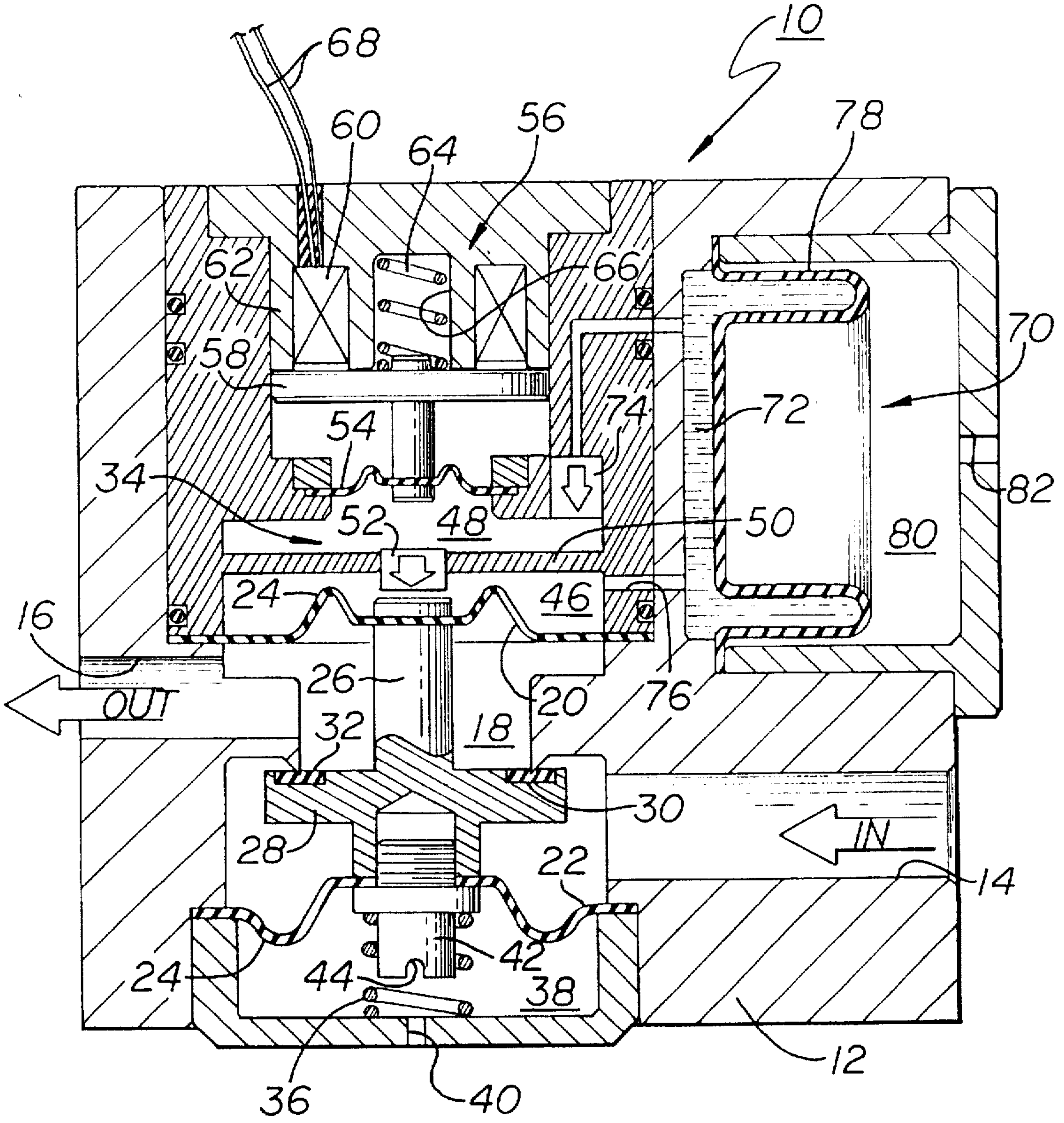
FIG. 1 is a cross-section of a valve of the present invention in a closed position.

Referring to the drawings more particularly by reference numbers, FIG. 1 shows a valve 10 of the present invention. The valve 10 has a valve housing 12 with both an inlet port 14 and an outlet port 16. The housing 12 also has a housing chamber 18 that can allow fluid to flow from the inlet 14 to the outlet 16. The housing chamber 18 is defined and sealed by first 20 and second 22 membranes, that are constructed from a flexible material and preferably have folded portions 24 that allow the membranes to expand and contract. Within the housing chamber 18 is a poppet 26 that has a head 28. As shown in FIG. 1, the head 28 normally sits on a valve seat 30, to prevent fluid communication between the inlet 14 and outlet 16. The head 28 may have a gasket 32 that engages the seat 30 to seal the valve 10 when in a closed position.

Figure 2:
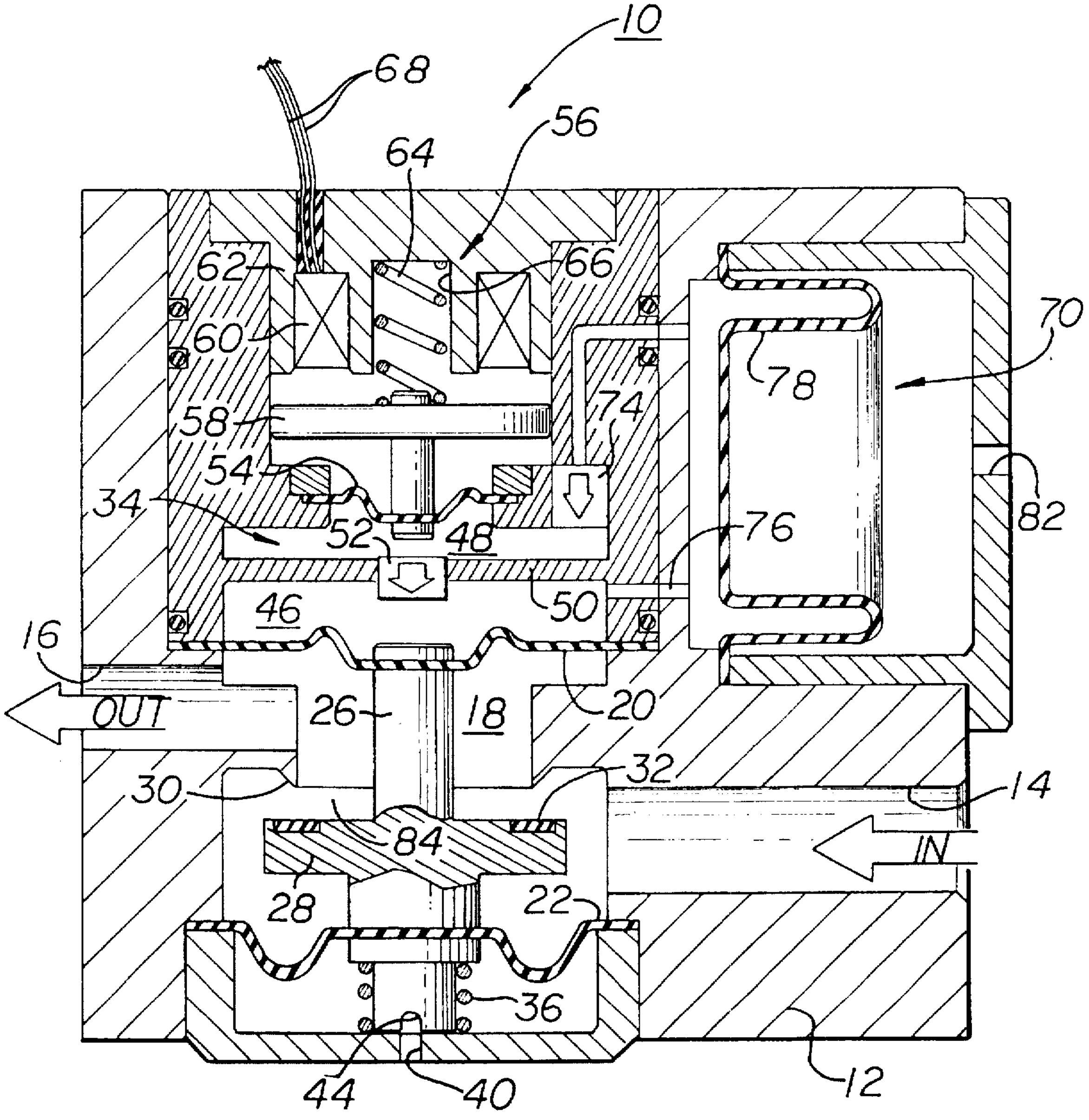
FIG. 2 is a view similar to FIG. 1, showing the valve in an open position.

The valve 10 has a pump generally denoted as 34. As shown in FIG. 2, the pump 34 can move the poppet 26 into an open position, wherein the head 28 is unseated from the valve seat 30 and fluid is allowed to flow from the inlet 14 to the outlet 16. Also attached to the poppet 26 is a first spring 36 that can move the poppet 26 back into the closed position, such that the head 28 is seated on the valve seat 30. The second membrane 22 and the housing 12 create a spring chamber 38 that is vented to the ambient through a first vent port 40. The spring chamber 38 may contain a stop 42 that limits the travel of the poppet 26 in the open position. The stop 42 may have a slot 44 to allow communication between the spring chamber 38 and the ambient, when the stop 42 is flush with the housing 12.

The pump 34 has a first pump chamber 46 separated from a second pump chamber 48 by a wall 50. The wall 50 has a first one way valve 52 that allows fluid to only flow from the second chamber 48 to the first chamber 46. The first chamber 46 is defined by the first membrane 20, the housing 12 and the wall 50. The second chamber 48 is defined by the wall 50, the housing 12 and a third membrane 54. The third membrane 54 is connected to a solenoid 56. The solenoid 56 has an armature 58 that is coupled to a coil 60 housed within a magnetic core 62. The armature 58 is attached to both the third membrane 54 and a second spring 64 that resides in a bore 66 of the magnetic core 62. The coil 60 is connected, through leads 68, to an outside source of electrical power (not shown). The power source can provide a series of electrical pulses that energize the coil 60 in a cyclical manner. In the preferred embodiment, the pulses are generated by creating one-half wave rectified ac power, typically at 60 hertz. Energizing the coil 60 causes the armature 58 to move into an energized position, as shown in FIG. 1. When the coil 60 is deenergized, the spring 64 moves the armature 58 back into the deenergized position shown in FIG. 2. The displacement of the armature 58 moves the third membrane 54, such that the second pump chamber 48 continually expands and contracts.

The valve 10 may also have a fluid reservoir 70 that contains pump fluid 72. The reservoir 70 is connected to the second chamber 48 through a second one way valve 74. The second valve 74 only allows fluid to flow from the reservoir to the second chamber 48. The housing 12 may contain an orifice 76 that allows pump fluid to flow between the first chamber 46 and the reservoir 70. The reservoir 70 may have a fourth membrane 78, that can expand and contract to compensate for volumetric changes in the chambers 46 and 48. The fourth membrane 78 may be located within a reservoir chamber 80 that is vented to the ambient through a second vent port 82.

In operation, the coil 60 is energized by the power source, inducing the armature 58 into the energized position and moving the third membrane 54, as shown in FIG. 1. The expansion of the second chamber 48 creates a pressure differential between the chamber 48 and reservoir 70, wherein fluid 72 flows through the second one way valve 74 into the second chamber 48. When the coil 60 is deenergized, the armature 58 and third membrane 54 move into the deenergized positions shown in FIG. 2.

The contraction of the second chamber 48 increases the pressure therein, causing fluid 72 to flow into the first chamber 46 through the first valve 52. This flow of fluid expands the first chamber 46 and moves the poppet 28 from the closed position to the open position. The pulsing of the solenoid 56 causes the second chamber 48 to constantly expand and retract, creating a pumping action that pressurizes the first chamber 46 and keeps the poppet 28 in the first position. The fluid being pumped into the first chamber 46 flows into the reservoir 70 through the orifice 76. From the reservoir 70, the fluid flows into the second chamber 48 and back into the first chamber 46 to complete the cycle. The pump 34 is a closed system that operates independently from the fluid controlled by the poppet 26. Using a closed system, the pump 34 is not dependent on the pressure of the working system. Additionally, contamination of the pump is greatly reduced, increasing the overall life of the valve 10.

When power is no longer supplied to the coil 60, the armature 58 moves into the deenergized position. The first spring 36 applies a force to the poppet 28, which moves the first membrane 20 and causes the pumping fluid to flow from the first chamber 46 to the reservoir 70 through the orifice 76. This flow of fluid 72 allows the spring 36 to move the poppet 26 into the closed position.

The diameter of the orifice 76 may be of any dimension to control the flow of fluid out of the first chamber 46. In the preferred embodiment, the diameter of the orifice 76 is quite small, so that the flowrate from the first chamber 46 is low. With a small orifice, the amount of fluid being pumped through the first chamber 46 is small, thereby limiting the change in volume of the chamber 46 and the movement of the poppet 26, while the second chamber 48 is pumping and the poppet 26 is in the open position. This flow control prevents fluctuations in the diameter of the valve orifice 84 between the opened poppet 26 and the seat 30. Instead of a single small hole, the orifice 76 could be a larger hole with a needle inserted therein to reduce the area of the hole. Such an arrangement is preferable when the hole diameter to material thickness is beyond generally available drilling techniques.

The pressure of the fluid 72 and the location of the stop 40 can be varied to change the displacement of the poppet 26 and the size of the valve orifice 84, depending on the pressure drop requirements of the valve 10. Although a normally closed two-way valve 10 has been shown and described, it is to be understood that the present invention can be used for other valve types, including normally open valves and three-way valves.

While certain exemplary embodiments have been described in detail and shown in the accompanying drawings, it is to be understood that such embodiments are merely illustrative of and not restrictive on the broad invention, and that this invention not be limited to the specific construction and arrangements shown and described, since various other modifications may occur to those ordinarily skilled in the art.

What is claimed is:

1. A valve, comprising:

a housing having an inlet and an outlet and a housing chamber that can allow fluid communication between said inlet and said outlet;

a poppet within said housing chamber, said poppet being adapted to be in an open position to create fluid communication between said inlet and said outlet, said poppet also being adapted to be in a closed position wherein said inlet is not in fluid communication with said outlet;

a pump having a first pump chamber in operative contact with said poppet such that said poppet is in said open position when said first pump chamber is pressurized and said poppet is in said closed position when said first pump chamber is depressurized, said pump having a second pump chamber separated from said first pump chamber by a wall that has a first one way valve which allows fluid to flow from said second pump chamber to said first pump chamber;

a solenoid having an armature operatively connected to said second pump chamber, said armature being adapted to expand and contract said second pump chamber, such that said first pump chamber is pressurized and said poppet is moved into said open position;

a fluid reservoir operatively connected to said second pump chamber through a second one way valve that allows fluid to flow from said fluid reservoir to said second pump chamber, when said armature expands said second pump chamber; and, an orifice that allows fluid to continuously flow from said first pump chamber to said fluid reservoir.

2. The valve as recited in claim 1, further comprising a first spring connected to said poppet to bias said poppet into said closed position.

3. The valve as recited in claim 2, wherein said solenoid has a coil coupled to said armature such that said armature expands said second pump chamber when said coil is energized, and a second spring connected to said armature such that said armature contracts said second pump chamber when said coil is deenergized.

4. The valve as recited in claim 1, wherein said housing chamber is sealed by a pair of membranes.

5. A valve, comprising:

a housing having an inlet and an outlet and a housing chamber that can allow fluid communication between said inlet and said outlet;

a poppet within said housing chamber, said poppet being adapted to be in an open position to create fluid communication between said inlet and said outlet, said poppet also being adapted to be in a closed position wherein said inlet is not in fluid communication with said outlet;

a first spring connected to said poppet to bias said poppet into said closed position;

a pump having a first pump chamber in operative contact with said poppet such that said poppet is in said open position when said first pump chamber is pressurized and said poppet is in said closed position when said first pump chamber is depressurized, said pump having a second pump chamber separated from said first pump chamber by a wall that has a first one way valve which allows fluid to flow from said second pump chamber to said first pump chamber;

a solenoid having an armature operatively connected to said second pump chamber and a coil coupled to said armature such that said second pump chamber is expanded when said coil is energized, said solenoid further having a second spring connected to said armature such that said second pump chamber contracts when said coil is deenergized, wherein said expansion and contraction of said second pump chamber pressurizes said first pump chamber and moves said poppet into said open position;

a fluid reservoir operatively connected to said first and second pump chambers;

a second one way valve that allows fluid to flow from said fluid reservoir to said second pump chamber, when said armature expands said second pump chamber; and, an orifice that allows fluid flow from said first pump chamber to said reservoir.

6. The valve as recited in claim 5, wherein said housing chamber is sealed by a pair of membranes.

* * * * *